United States Patent [19]

Weiss

[11] 4,210,073
[45] Jul. 1, 1980

[54] PORTABLE ENVIRONMENTAL CHAMBER

[76] Inventor: Margaret R. Weiss, 1508 Greenbrier Dr., Elkhart, Ind. 46514

[21] Appl. No.: 972,826

[22] Filed: Dec. 26, 1978

Related U.S. Application Data

[63] Continuation of Ser. No. 793,597, May 4, 1977, abandoned, which is a continuation-in-part of Ser. No. 616,175, Sep. 24, 1975, abandoned.

[51] Int. Cl.² .................. A21C 13/00; A21D 8/02
[52] U.S. Cl. .................. 99/483; 126/281; 219/385
[58] Field of Search ............. 99/483, 646 R; 47/22; 119/33; 135/5 E, 14 H, 14 L; 34/151; 4/161, 162, 164; 126/281; 219/400, 385, 535, 545, 211, 212, 527, 528, 529

[56] References Cited

U.S. PATENT DOCUMENTS

| 703,826 | 7/1902 | Randall | 4/164 |
|---|---|---|---|
| 1,162,897 | 12/1915 | Ames | 126/281 X |
| 1,440,755 | 1/1923 | Winberg | 119/33 |
| 2,307,569 | 1/1943 | Conners | 135/5 E |
| 2,405,627 | 8/1946 | Williams | 135/5 E |
| 3,148,688 | 9/1964 | Arnopole | 135/14 V |
| 3,169,544 | 2/1965 | Brown | 135/5 E |
| 3,361,895 | 1/1968 | Achner | 219/385 |
| 3,418,453 | 12/1968 | Sparks | 126/281 X |
| 3,419,915 | 1/1969 | Clark | 4/160 |
| 3,739,792 | 6/1973 | Holland | 135/14 H |

FOREIGN PATENT DOCUMENTS 1155108  11/1957  France ........................ 99/646 R Primary Examiner—Billy J. Wilhite

[57] ABSTRACT

The present invention relates to a portable environmental chamber comprising a tent-like structure having an integral heating means associated therewith. More specifically, it relates to a collapsible food preparation and processing device having a combination heat retaining foldable closure and a heating means for providing a predetermined temperature within said closure, the heating means integrally associated with the closure means.

5 Claims, 5 Drawing Figures

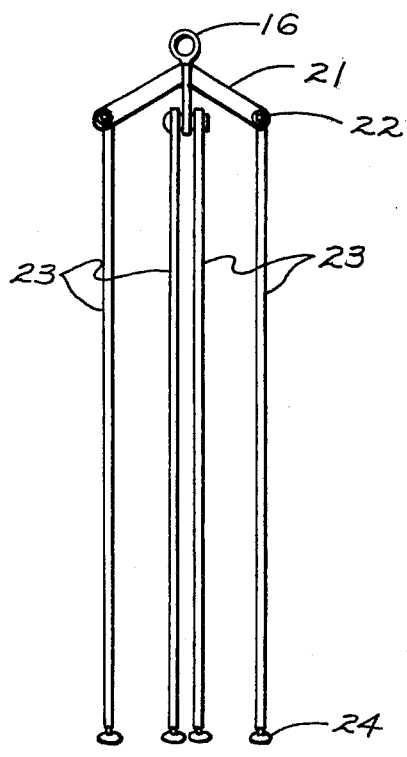
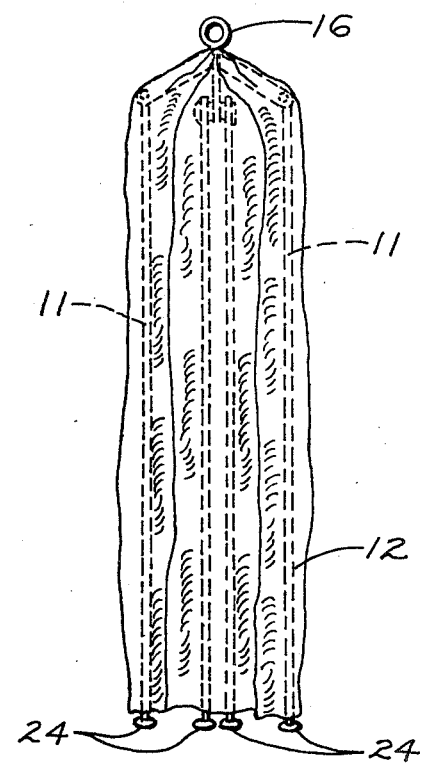
FIGURE 2.   FIGURE 3.
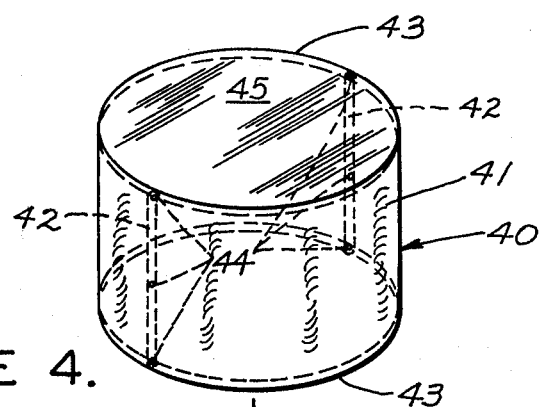
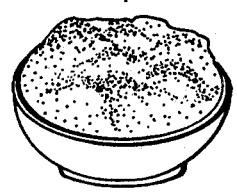
FIGURE 4.

PORTABLE ENVIRONMENTAL CHAMBER

CROSS-REFERENCES TO RELATED APPLICATIONS

This application is a continuation of application Ser. No. 793,597, filed May 4, 1977, now abandoned, which was a continuation-in-part application of application Ser. No. 616,175, filed Sept. 24, 1975, now abandoned.

BACKGROUND OF THE INVENTION

1. Field of the Invention

Home baking has retained its popularity and utility over the years to the present time, notwithstanding the wide availability of packaged, prebaked goods such as bread, dinner rolls, and so forth. Such home baking requires that the flour be mixed with yeast or other rising agents to form a dough and allowing the dough to stand at a temperature higher than ambient temperatures. Usually this procedure is accomplished by placing the dough in a dish close to a source of heat such as a heat register and covering the dough with a cloth or other means to somewhat control the heat loss. Often the dish containing the dough is placed in a second container of hot or warm water and allowing the dish to remain therein for the desired period of time. Needless to say, these procedures do not produce consistent results and often causes the novice baker to become discouraged and abandon efforts in this area.

2. Description of the Prior Art

The prior art directed to dough proofing devices comprises primarily those designed for commercial use. Exemplary of the patents covering such devices is U.S. Pat. No. 3,034,455. Obviously, these patents have no bearing on the novelty of the present devices. They merely describe the extent to which such devices have developed over the years.

There is no direct art relating to a foldable environmental chamber or device such as is described in the present disclosure. The nearest related art relates to devices which are used to hold foods such as bread rolls in a warm condition prior to eating. See U.S. Pat. No. 3,098,924. French Patent No. 1,155,108 relates to a foldable food covering device which is obviously used to protect food from dirt, flying insects, and so forth. U.S. Pat. No. 2,307,569 relates to another such device.

Analogous art relating to foldable devices is described in U.S. Pat. Nos. 3,148,688 (camping tent); 3,169,544 (collapsible frame); and 2,405,627 (collapsible receptacle). Other portable devices are described which may contain or are associated with heating means such as saunas (U.S. Pat. No. 2,466,490) and chicken brooders (U.S. Pat. No. 1,440,775). Such devices, however, do not have a heating means integrally associated with the chamber itself.

U.S. Pat. No. 3,739,792 describes an umbrella with heating means located in the ribs of the umbrella such as to heat and warm the holder of the device. Such a device is obviously open to the elements, at least on the bottom, and cannot be considered a chamber, especially one utilized advantageously for food uses.

OBJECTS OF THE PRESENT INVENTION

It is a primary object of the present invention to provide a portable, foldable chamber means which contains an integral heating means and which when placed on a surface area supporting the device forms an enclosed evenly distributed heated environment with respect to ambient surrounding temperatures.

It is an object of the present invention to provide an economical and simple device for maintaining proper warming and proofing temperatures for home baking.

It is another object to provide a device for maintaining proper moisture for the proofing of baking dough.

It is still another object to provide a device which is portable and easy to store in the limited space of modern kitchens.

A final object is to provide the homemaker with a simple device for providing a warm environment for various home uses, such as butter melting or softening, cream cheese softening, fermenting fruit, preparing yogurt or other fermented products, and so forth.

SUMMARY OF THE INVENTION

These and other objects, which will become evident from the ensuing disclosure, re achieved by a simple, collapsible tent-like closure and a heating means integrally associated therewith.

BRIEF DESCRIPTION OF THE DRAWINGS

FIG. 2 is a side view of a form of support means for the closure.

FIG. 3 is a view of the device of FIG. 1 in a folded position.

FIG. 4 is a perspective view of another device of the present invention in an unfolded position.

DESCRIPTION OF THE PREFERRED EMBODIMENTS

Figure 1:
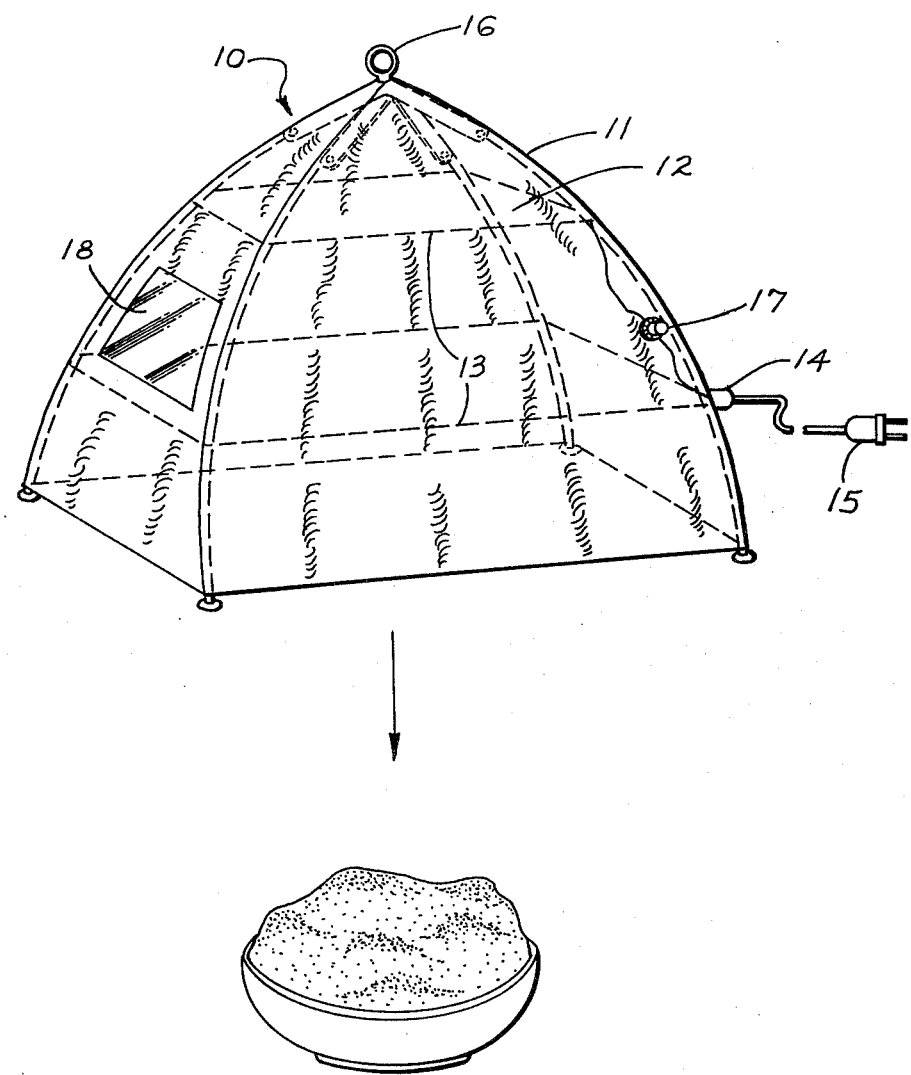
FIG. 1 is a perspective view of a device of the present invention in an unfolded position.

FIG. 1 shows a tent-like device of the present invention in an unfolded position ready to be placed over a container of dough. The device comprises basically four supporting somewhat flexible legs 11 joined at the apex 16 which may be in the form of a ring for hanging purposes, to form a gothic arch dome-like structure 10. A flexible covering material 12 shaped like the device is placed over the legs 11 in a manner similar to a tent skin. This covering 12, which may comprise a somewhat moisture and heat retaining material, such as fibre glass cloth, may or may not be removably associated with said legs or supporting means 11. A heating means 13, such as resistance wire, is integrally associated with the covering material 12 and may be laminated between layers of the fibre glass cloth covering material 12 or may be attached to the inside thereof.

A thermostat 17 is connected to the heating elements in order to more accurately control the temperature inside the closure 10. A connector 14 to the heating elements 13 and a plug 15 for connecting to a source of electrical power is also provided.

A window means 18 may be provided in the closure 10 so that the substance being warmed may be viewed without removing said closure.

FIG. 2 is a detailed drawing of the pivot point 16 and legs 11 of the supporting means of FIG. 1 and comprises four fixed legs 21 and four pivoting legs 23 connected thereto by connectors 22. Bases 24 made of materials such as rubber to prevent marring of table tops may also be provided.

FIG. 3 shows the device of FIG. 1 in a folded or collapsed position, wherein the legs 11 are folded together and the flexible covering material 12 is collapsed around such folded legs. The apex 16 and the leg bases 24 extend out of the folded flexible covering material 12.

FIG. 4 shows a barrel-like or cylindrical shaped closure 40 comprising supporting legs 42 attached to rings 43 enclosed by a covering material 41. Heating wires 46 attached to a connector 47 are associated with the covering material 41. A plug 48 is also provided for attachment of the heating wire 46 to a power source. The supporting legs are pivotally connected at the center thereof and where attached to the rings by connectors 44 so that the device may be collapsed upon itself for storage. The top 45 may be made of a transparent material such as a heat resistant plastic film for easy visibility of the material contained therein.

Figure 5:
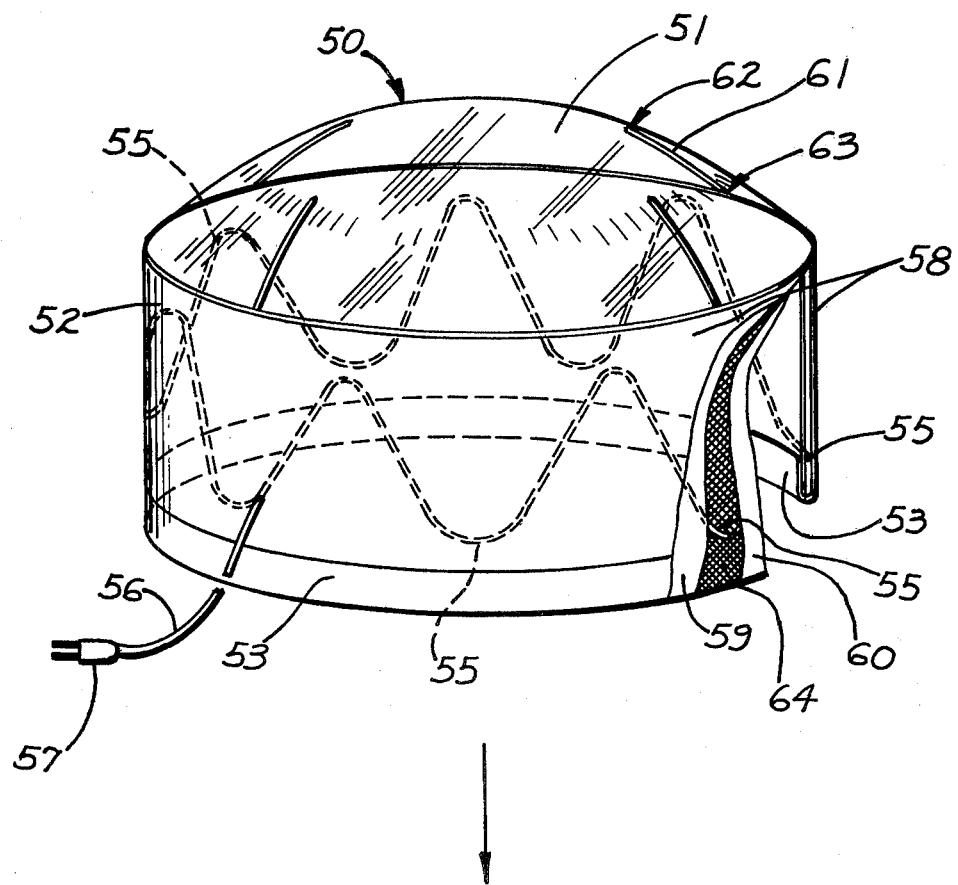
FIG. 5 is a perspective view of a self-supporting device having a clear dome-like upper cover.
Figure 5:
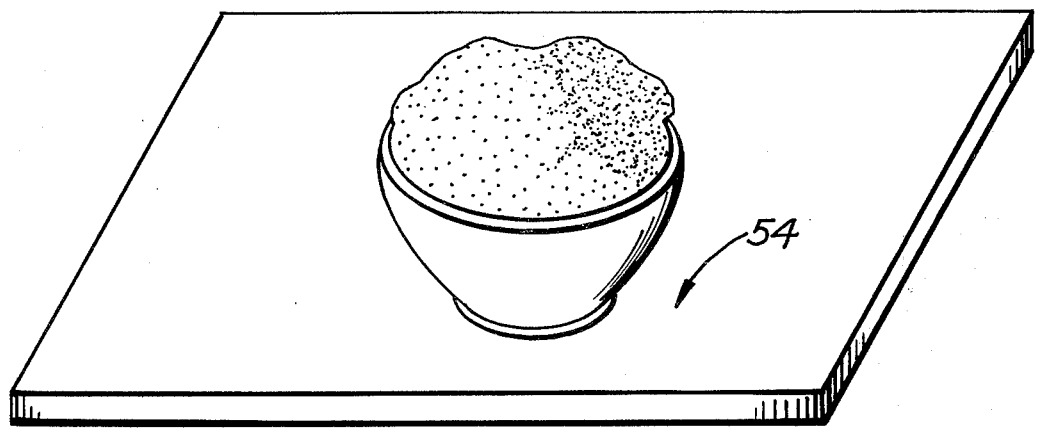

FIG. 5 shows a preferable embodiment of the present invention which consists basically of an opaque laminated wall portion 52 forming a barrel-like self-supporting lower structure and a transparent dome-like cover 51 connected to the upper edge of the bottom wall portion 52. The wall 52 comprises a plastic-foil-plastic laminate into which is incorporated the heating element 55 attached to a nylon scrim or netting 64. The heating element 55 is in turn connected to an electrical wire 56 and plug means 57 for association with an electrical power source such as 110 Volts AC. Typically, the dome is constructed of a 0.012 inch clear polyvinyl chloride sheet material, which contains pleats 61 starting at the peripheral edge 63 of the dome and proceeding inward to a point 62 short of the center thereof. Such a construction is dome-like and yet contains a flat center portion for relatively clear viewing of the contents inside. The wall 52 is a laminate consisting of an inner sheet 60 of 0.006 inch thick opaque polyvinyl chloride, a sheet of aluminum foil 59 and a second sheet of opaque 0.012 inch thick polyvinyl chloride 58. As mentioned above, the heating element 55 attached to scrim 64 is contained in a zigzag or other pattern for even heat distribution between the inner sheet 60 and the aluminum foil 59 or outer sheet 58. The 0.006 inch inner sheet 60 is constructed of thinner material than outer sheet 58 to allow heat to migrate into the chamber and in effect conserve energy. The outer sheet 58 is folded over the inner sheet 60 at the bottom thereof to form a cuff 53 for additional support.

In use the chamber 50 is lowered over the food being processed which is placed on a flat table surface 54 to form the closed environment required for such processing.

Typically, the material of construction of the device of the present invention such as that shown in FIG. 5 is a food grade polyvinyl chloride having a wall thickness of up to about 0.012 inches. The material should be foldable but sufficiently rigid to be formed into a self-supporting structure. The material should retain its dimensional stability without becoming soft and pliant at operating temperatures which for bread dough proofing should be about 27° C. to 30° C.

The polyvinyl chloride material referred to above can be and preferably is, joined by heat sealing using dielectric heat means; however, pieces can be sewn or glued as necessary. Other plastic materials which may be used are polyethylene, polypropylene, nylon, non-woven textiles and heat sealable polyester films.

The heating means (55 in FIG. 5) is made of electrical resistance wire and for the device shown in FIG. 5 (when constructed to have a diameter of 36 cm.) should be a 10 foot (3.04 meters), 22 Watt, 120 Volt standard resistance wire. Such a heating means will create in the chamber a 20° F. (11° C.) heat rise over ambient temperature. This has been found ideal for dough proofing and yogurt making.

The above embodiments are merely illustrative of the present invention and are not intended as a limitation of the inventive concept described herein.

I claim:

1. A portable environmental chamber for home food preparation and processing uses comprising
   (a) a continuous, upstanding wall member consisting of a laminate having an outer and inner layer of plastic foil with a scrim held between said layers;
   (b) a cover member associated with said wall member to define, in combination, a closure having a single, planar opening,
       said closure, when disposed on a flat supporting surface, forming with said surface a totally enclosed chamber,
       said wall and cover members being composed of flexible material whereby said closure is collapsible; and
   (c) an electrical resistance wire heating means attached to said scrim in said wall member in a substantially evenly distributed pattern for providing a substantially uniform controlled radiation of heat into said enclosed chamber whereby a constant predetermined temperature can be attained within said chamber.

2. The chamber of claim 1 wherein said electrical resistance wire heating means is capable of radiating sufficient heat to provide a constant temperature within said chamber in room temperature surroundings of between about 27° C. and 30° C.

3. The chamber of claim 1 wherein said upstanding wall member is cylindrical.

4. The chamber of claim 3 wherein said cover member is dome-shaped.

5. The chamber of claim 4 wherein said wall member is opaque and said cover member is transparent.

* * * * *